No. 799,915. PATENTED SEPT. 19, 1905.
J. METZGER.
HOSE COUPLING.
APPLICATION FILED JUNE 2, 1905.
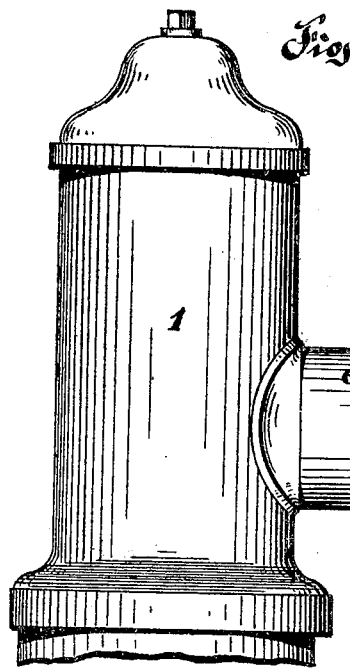
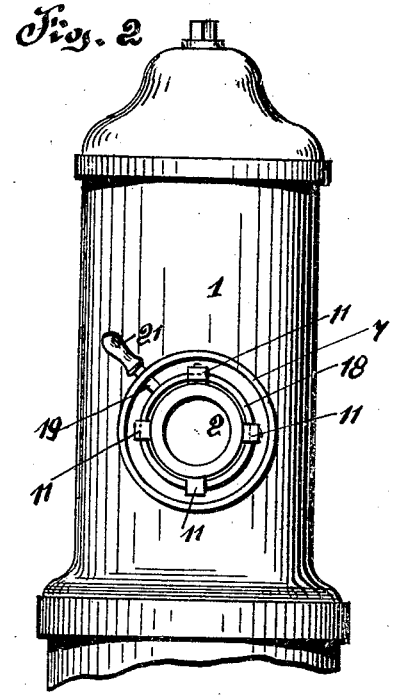
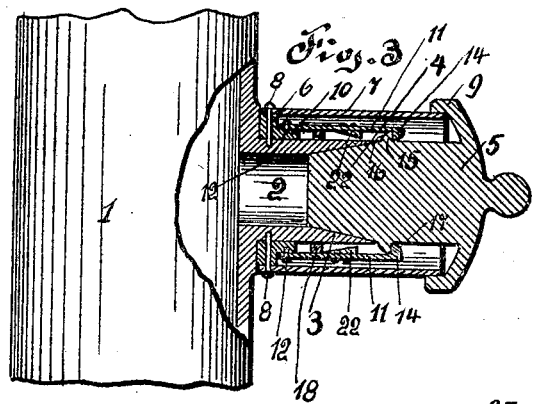
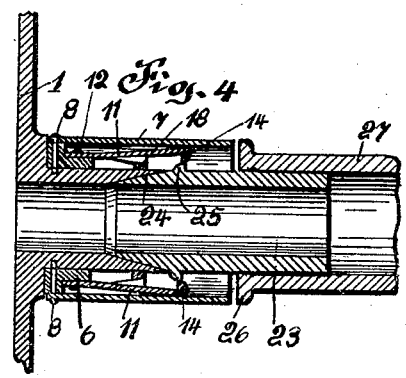
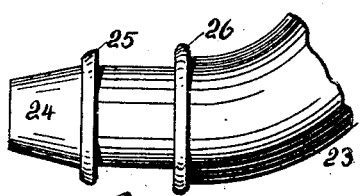
Witnesses:
Inventor,
John Metzger.
by N. C. Evert & Co.
Attorneys.

UNITED STATES PATENT OFFICE.

JOHN METZGER, OF NORTH BRADDOCK, PENNSYLVANIA.

HOSE-COUPLING.

No. 799,915. Specification of Letters Patent. Patented Sept. 19, 1905.

Application filed June 2, 1905. Serial No. 263,425.

*To all whom it may concern:*

Be it known that I, JOHN METZGER, a citizen of the United States of America, residing at North Braddock, in the county of Allegheny and State of Pennsylvania, have invented certain new and useful Improvements in Hose-Couplings, of which the following is a specification, reference being had therein to the accompanying drawings.

This invention relates to certain new and useful improvements in hose-couplings; and the invention has for its object the provision of novel means for quickly and effectually joining together two sections of hose or a section of hose to a fire hydrant or plug.

My invention aims to entirely dispense with the use of screw-threads for connecting two sections of hose together. It is a well-known fact that the hose used by fire departments must be quickly joined together or connected to a fire-hydrant in case of a fire, and it is also a well-known fact that when screw-threads are employed for connecting the hose together considerable time is required which delays the firemen in reaching the scene of the conflagration. In view of these facts I have devised a coupling that can be easily and quickly manipulated to join two sections of hose or to connect a section of hose to a fire-plug. In constructing my improved coupling I have made the same as simple as possible consistent with a strong and durable construction which will withstand the rough usage to which couplings of this character are subjected when used.

With the above and other objects in view, which will more readily appear as the nature of the invention is better understood, the same consists in the novel construction, combination, and arrangement of parts, which will be hereinafter more fully described, illustrated, and then specifically pointed out in the claims.

The essential features of my invention are embodied in the accompanying drawings, in which—

Figure 1 is a side elevation of a fire hydrant or plug constructed in accordance with my invention. Fig. 2 is a front elevation of the same, the cap thereof being removed. Fig. 3 is a fragmentary sectional view of the hydrant, illustrating the cap thereof in position. Fig. 4 is a similar view illustrating the end of a piece of hose secured to the hydrant, and Fig. 5 is a side elevation of one end of a section of hose. Fig. 6 is a detail view of a band or ring.

In the accompanying drawings I have illustrated a conventional form of hydrant or plug to which a fire-hose is adapted to be connected, said hydrant or plug being in communication with a suitable water-supply main. In the present illustration I have illustrated a hydrant or plug 1 as having one outlet; but it is obvious that the same may be provided with a plurality of outlets, to which sections of hose may be connected in the hereinafter-described manner. The hydrant or plug 1 carries an outwardly-extending spout 2, the inner sides of which adjacent to the outer end of said spout are beveled, as indicated at 3, to receive the tapering end 4 of a cap 5, which is adapted to close the hydrant when the same is not being used. The periphery of the spout 2 adjacent to the body of the hydrant 1 is provided with an annular shoulder-band 6, to which is secured an outwardly-extending tubular shell 7, adapted to surround the spout and a portion of the cap. Suitable screw bolts or pins 8 are employed to retain the tubular shell 7 in engagement with the band 6, these screw-bolts also being employed to retain the band in engagement with the spout 2. The head of the cap 5 is flanged, as indicated at 9, to embrace the outer end of the tubular shell 7.

The shoulder 10 of the band 6 is provided with a plurality of outwardly-extending resilient arms 11 11, in this instance said arms being four in number. These arms are secured to the shoulder 10 of the band 6 by suitable rivets or screws 12, and the outer or loose end of each arm is provided with an inwardly-extending lug 14, adapted to engage a peripheral collar or flange 15, carried by the cap 5. The flange or collar 15 is provided with a beveled surface 16, and the outer surface of the lugs 14 are provided with beveled surfaces 17, these beveled surfaces being employed to assist the lugs 14 in riding over the flange or collar 15 to lock the cap in engagement with the hydrant.

A ring or band 18 is mounted upon the spout 2, and this ring or band is provided with an outwardly-extending radially-disposed handle 19, protruding through a longitudinally-disposed slot 20, formed in the tubular shell 7. The outer end of the handle 19 is provided with a suitable knob 21. The ring or band 18 is employed to actuate the arms 11 11 to release the cap 5, and to accomplish this I have provided the inner faces of the arms 11 11 with suitable cam-blocks 22, with which the ring or band engages in order to force the arms outwardly to disengage the lugs 14 from the flange or collar 15 of the cap, at which time said cap can be easily removed from the hydrant.

In Figs. 4 and 5 of the drawings I have illustrated a metallic coupling member 23, which is employed in connection with sections of hose. This member is tubular in form and is provided with a tapering end 24, adapted to fit within the spout 2 of a hydrant. The coupling member 23 is also provided with a peripheral flange or collar 25, similar to the collar 15 heretofore mentioned as carried by the cap 5. The member 23 is provided with an annular flange 26, against which the end of a section of hose 27 is adapted to abut, suitable means, such as ordinarily employed in connection with fire-hose, being used to retain the section of hose 27 upon the member 23.

In operation when it is desired to connect a section of hose to the hydrant or plug 1 the cap 5 is removed by moving the handle 19 toward the outer end of the spout 2, this movement of the handle causing the band or ring 18 to engage the cam-blocks 22 of the arms 11 and force the same outwardly and release the cap 5 and permit of its removal from the hydrant. The tapering end 25 of the member 23 carried by the section of hose to be connected to the hydrant is placed in the end of the spout 2, and by forcing inwardly upon the section of hose the lugs 14 of the arms 11 ride over the flange or collar 25 of the member 23, locking the member in engagement with the hydrant. The operation of removing the section of hose from the hydrant or plug is similar to the operation of removing the cap 5.

I may find by the constant use of the band 18 that the frictional engagement of the band and spout 2 may retard the adjustment of said band. If so, I will provide the band 18 with rollers 18', (see Fig. 6,) said rollers engaging the spout 2 and permitting of the band being easily moved.

My improved coupling can be readily used in connection with nozzles that are to be secured to a section of hose, and while I have herein described the same as particularly adapted for fire-hose it is obvious that it may be readily employed in connection with various types of flexible pipes.

I do not care to confine myself to any particular kind of material from which the coupling members and their appurtenant parts may be made or to the size, proportion, or detail construction of the various parts entering into my invention.

What I claim, and desire to secure by Letters Patent, is—

1. In a coupling of the character described, the combination with a hydrant having an outlet-spout, the end of said spout being beveled inwardly, of a band carried by said spout, a tubular shell carried by said band, resilient arms carried by said band and adapted to lock a cap or section of hose in engagement with said spout, cam-shaped blocks carried by said arms, a ring surrounding said spout, a lever carried by said ring and protruding through said shell, said ring being adapted to engage said blocks and spread apart said arms, substantially as described.

2. In a coupling of the character described, the combination with a suitable hydrant having an outlet-spout, of resilient arms carried by and upon the outside of said spout, a tubular shell carried by said spout and surrounding said arms, said arms being adapted to engage a cap or a coupling member placed within said shell, and means carried by said spout to move said arms outwardly, said means being actuated from the exterior of said shell, substantially as described.

3. In a coupling of the character described, the combination with a hydrant having a suitable outlet-spout, of a coupling member adapted to be connected to said spout, resilient arms carried by and upon the outside of said spout and adapted to engage said coupling member, means to protect said arms, means mounted upon said spout to release said arms from engagement with said coupling member, substantially as described.

In testimony whereof I affix my signature in the presence of two witnesses.

JOHN METZGER.

Witnesses:
  JAS. V. MCMASTERS,
  ALBERT BRIGG.